March 22, 1927.

E. W. HOPKINS 1,621,928

CORN NUBBINER

Filed May 13, 1925

Inventor

E. W. Hopkins

By Lacey & Lacey, Attorneys

Patented Mar. 22, 1927.

1,621,928

UNITED STATES PATENT OFFICE.

ELLIS W. HOPKINS, OF OBERLIN, KANSAS.

CORN NUBBINER.

Application filed May 13, 1925. Serial No. 30,062.

This invention has for its object the provision of a very simple, inexpensive and efficient device whereby imperfect kernels of corn may be removed from the cob. Another object of the invention is to provide means whereby spoiled kernels may be separately removed so as to be kept free of the good kernels. The invention is illustrated in the accompanying drawing and consists in certain novel features which will be particularly pointed out in the claim following a detailed description.

Figure 1:
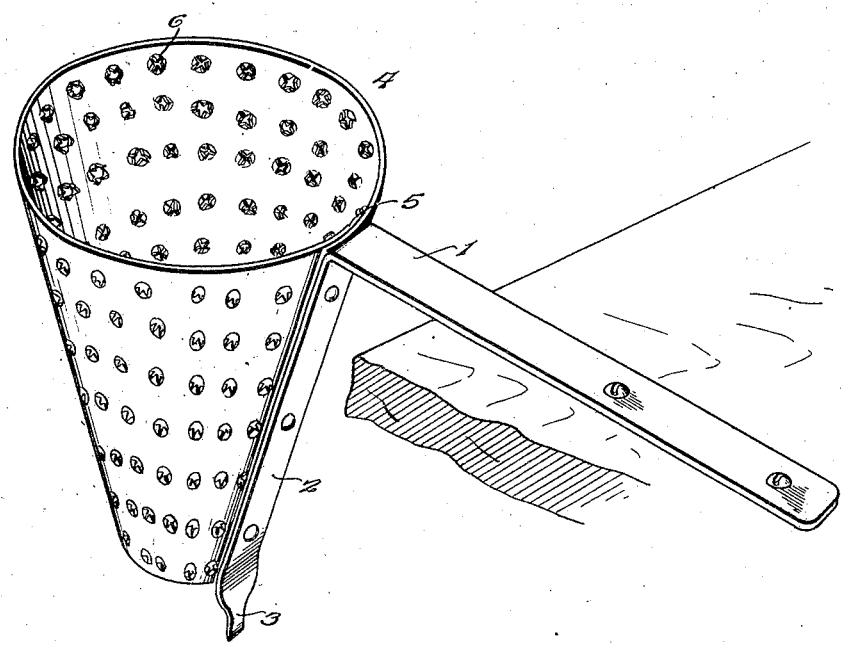
Figure 1 is a perspective view of one embodiment of my invention.
Figure 2:
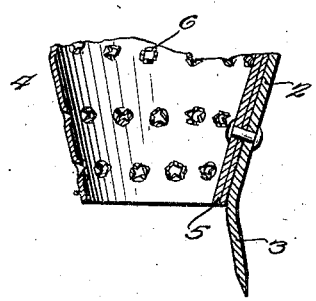
Fig. 2 is a detail section of the lower end of the device.

In carrying out my invention, I employ a bracket which defines a supporting arm 1 adapted to be secured to any fixed support, as shown in Fig. 1. From the free end of this supporting arm 1, a hanger member 2 depends and said hanger member terminates in a tooth or prong 3. Secured upon the hanger portion 2 of the bracket so as to be carried thereby is a shell or open-ended basket 4 which is open at both top and bottom and may be conveniently formed by rolling a sheet metal blank upon itself and securing the meeting overlapping ends 5 of the blank rigidly to the hanger member 2. Throughout the extent of the sides of this shell, rough projections 6 are formed on the interior thereof by striking inwardly portions of the material, as clearly shown in the drawing. It will be readily noted that the shell tapers downwardly so that it will conform approximately to the shape of an ear of corn, the end of which is to be inserted into the shell when the device is used.

My device is intended more particularly for removing the small uneven kernels of seed corn from the ends of the ears before placing the ears in a corn sheller. As stated, the supporting bracket is secured to a fixed support, which may conveniently be the frame of a corn-shelling machine, and the shell or downwardly tapered drum is rigidly secured to the hanger member of the bracket. The lower end of the shell is disposed above the prong or tooth 3 so that said prong is accessible at all times to remove a spoilt kernel from the cob before shelling the good kernels. To remove these spoilt or dead kernels, the ear of corn is presented to the prong so that the end of the prong will bear against the side of the kernel and then by manipulating the ear in an obvious manner the defective kernel will be removed. To remove the good kernels, the end of the ear is inserted downwardly within the shell so that it engages the inner surface of the shell and then by rocking or rotating the ear within the shell the projections 6 will engage the kernels and strip them from the cob. When the cob is lifted from the shell, the removed kernels will, of course, pass through the open bottom of the shell and may be caught in a receptacle placed therebelow. The device is exceedingly simple and may be produced at a low cost. The device is intended to effect a grading of the corn so that the farmer will have kernels of nearly uniform size for planting and, therefore, obtain a more even stand of corn after planting than has heretofore been the case. The lower end of the cup should be of such diameter that it will prevent the ear or cob from passing therethrough and permit it to enter only so far as to effect removal of the small grains or kernels at the end of the ear. After the small grains at one end of the ear have been removed, the ear is reversed and the small grains removed from the opposite end, the ear thus treated being then fed into a corn-sheller in the usual manner. As a result of the described procedure, the shelled kernels delivered by the corn sheller will be substantially uniform in size and the farmer will be reasonably assured of a uniform stand in his crop.

Having thus described the invention, I claim:

A device of the character described comprising a hollow shell having internal operating teeth adapted to remove kernels from an ear of corn inserted into the shell, said shell consisting of a strip of material coiled to form the shell and having its end portions overlapped, a mounting bracket adapted to be secured to a support and including an arm extending longitudinally upon the overlapped portions of the shell forming strip, and fasteners passed through the arm and overlapped portions of said strip to retain the strip in shell forming position and the shell in engagement with the bracket arm.

In testimony whereof I affix my signature.

ELLIS W. HOPKINS. [L. S.]